United States Patent [19]

Gordon

[11] 4,152,061

[45] May 1, 1979

[54] SELF-FOCUSING CAMERA APPARATUS AND METHOD

[76] Inventor: Gary B. Gordon, 2112 Bank Mill Rd., Saratoga, Calif. 95070

[21] Appl. No.: 901,564

[22] Filed: May 1, 1978

[51] Int. Cl.² .................... G03B 3/10

[52] U.S. Cl. .................... 354/195; 352/140; 358/227

[58] Field of Search .................... 354/195, 25, 81; 358/227; 352/140; 355/56

[56] References Cited

U.S. PATENT DOCUMENTS

| | | | |
|---|---|---|---|
| 3,797,909 | 3/1974 | Hadzimahalis | 354/195 X |
| 4,120,004 | 10/1978 | Coutta | 358/227 X |

*Primary Examiner*—Michael L. Gellner
*Attorney, Agent, or Firm*—A. C. Smith

[57] ABSTRACT

A method and apparatus are provided which automatically focus a television camera or motion picture camera, or the like, in applications where, for any given camera-pointing direction, the desired subject will lie at a single-valued and predetermined distance from the camera such as on a planar surface. In one embodiment, a mechanical linkage enables a camera, shooting downward onto a flat playing field, to self-focus on any point in that field. In an electronic embodiment, a learn mode is included that handles events on more complicated terrains such as mountainous terrain in skiing events. In these cases, the self-focusing action is instantaneous, continuous and accurate.

5 Claims, 4 Drawing Figures

45 BI-DIRECTIONAL DATA BUS
51 DECLINATION ANGLE ENCODER
49 LENS FOCUS SERVO
41 μP
55 ROM
53 AZIMUTH ANGLE ENCODER
57 MODE SWITCH
47 RAM
ADDRESS BUS 43

SELF-FOCUSING CAMERA APPARATUS AND METHOD

BACKGROUND OF THE INVENTION

It is desirable that cameras used for photographing action events be as automatic as possible in order to free the cameraman to concentrate on picture composition. Ideally, the cameraman should only have to concern himself with the subjective element of framing (pointing and zooming) and not the more objective elements of focusing and exposure.

Focusing is not a significant problem at events which occur in daylight since the lens aperture may be reduced to the point where the depth of field is adequate. Focusing is a significant problem, however, at indoor or night events where low light levels necessitate using large lens apertures, particularly if color fidelity is to be maintained. Such apertures produce shallow depths-of-field and necessitate careful and frequent refocusing. As the lens is zoomed to increase image size the focusing becomes even more critical. A further problem is that when an image is slightly out of focus, it is difficult to determine whether focusing is long or short without a trial-and-error procedure. Thus, a cameraman usually experiences difficulty shooting an action sequence under artificial lighting conditions with tight framing and acceptable maintenance of focus.

Focusing aids such as split-image and microprism range-finders are seldom employed in action photography because they are too slow. A partial solution to the problem is to establish focus presettings which may be selected by buttons or stops associated with certain frequently-used distance settings. One button could be preset, for example, to the distance to a hockey goal. Focus presets were developed, however, for use in staged studio applications where subjects are located at only a few specific fixed distances, and are of little use in sports photography where sharp focusing is required over a continuum of focal distances.

Autofocusing devices for still cameras are disclosed in the literature (see, for example, U.S. Pat. Nos. 3,538,830 through 3,538,833; 3,572,230; and 3,730,068). Devices of this type commonly reference to a pendulum and assume that the photographer is standing on the same baseline as the subject. This requires that he momentarily point the camera at the subject's feet before each shot to achieve focus. This deframing procedure, and the oscillations of the pendulum induced by slewing the camera, preclude its application in motion photography.

Other known autofocusing devices recognize that focusing information can be derived from knowledge of the lens focal length, height of the camera, and angle by which the camera is pointed below the horizon (see, for example, U.S. Pat. No. 2,456,317). To solve this equation which has three variables, interchangeable three-dimensional cams are used. However, these cams are difficult to manufacture and are difficult to mount for proper tracking in the camera stand.

SUMMARY OF THE INVENTION

In accordance with the present invention, camera focus is automatically derived from knowledge of the direction in which the camera is pointed in conjunction with the condition that, for any camera-pointing angle of interest, the subject is located at a single-valued distance from the lens. This condition is satisfied, for example, when events are viewed from an elevated position above a planar field but, of course, is not satisfied when such events are viewed from within the plane of the field (i.e., from ground level).

In one embodiment of the present invention, camera-focusing operation is optimized for the case of shooting from high camera elevations such as at sports events or the like which take place on level, plane surfaces. Such events include those taking place on fields, tracks, arenas, rinks, pools, and courts. Under such conditions, only the camera declination angle is required to derive proper focus, since the camera azimuth angle is not a factor.

The focusing motion of the lens may be derived mathematically from the declination angle ($\phi$) and the height (H) of the camera above the object. First, the lens-to-subject distance $(d_o) = H/\sin\phi$. The required shift (s) of the camera lens from its infinity position can in turn be derived from $d_o$. Specifically, $$S = \{F/[1-(F/d_o)]\} - F,$$

where F is the focal length of the camera lens. Combining equations, then, the required lens shift necessary to achieve focus, as a function of declination angle $\phi$, is:

$$s = \{F/[1-(F \sin \phi)/H]\} - F,$$

where F and H are constant for a given camera and location.

The ratio of lens focal length to camera height, F/H, is generally a very small number of the order of 0.01. To this extent that $F < H$, the lens-shift equation can thus be simplified to $$s = (F^2/H) \sin \phi,$$

or a simple constant times the sine of the declination angle.

In one embodiment of the present invention, this equation is implemented using mechanical linkage which converts the declination angle $\phi$ to linear motion proportional to its sine by a mechanism connected to the tilt-head of the camera tripod or to an artificial level. This linear motion is then used to shift the camera lens to effect focusing, and also to rotate the focusing handle in order to provide feedback to the cameraman.

It is desirable that the operator be able to override such an autofocusing feature in certain instances, such as when swinging the camera upwards to pick up a scoreboard.

In practice, it is not necessary to know the numerical values of the lens focal length and camera height. Rather, it is sufficient to include a control knob that adjusts the gain of the mechanical linkage which converts the angular motion into focusing motion of the lens. The use of this adjustment is described shortly.

With the present invention, a set-up procedure for a camera simply requires leveling the tripod, checking the tracking at infinity (and adjusting if necessary), and finally focusing on one point in the field using such a gain-control knob. Once this knob is set to achieve focus on one point in the field, focusing for all other points in the field will be achieved automatically, whether the camera is pointed horizontally, straight down, or to any point in between. The present invention is thus well suited for level playing fields due to the simplicity of the equation relating the lens shift to the camera declination angle, and the subsequent ease with which the equation can be implemented mechanically.

In another embodiment of the present invention, the more complicated relationship between lens shift and the direction in which the camera is pointed during shooting of an event over varying terrain, such as a skiing event, is determined electronically using previously-stored focus information.

In this electrical embodiment, the focusing information is stored for each angular direction of the lens as data contained in a look-up table of values of lens shifts which correspond to camera-pointing directions. The table may be generated on-site before an event by pointing the camera at points along the path of the event, focusing manually at each point, and electronically storing the resulting data. In use, then, the lens-shift data corresponding to the direction in which the camera is currently pointed is derived from the look-up table and may even be interpolated if desired between stored data points. In this embodiment, angle transducers are disposed on the azimuth and declination axes of the camera and tripod, and an electronic controller such as a microprocessor, and a lens-focusing servo are arranged to control focus as the camera tracks an object along the course from which the focusing data was previously derived.

DESCRIPTION OF THE PREFERRED EMBODIMENTS

Figure 1:
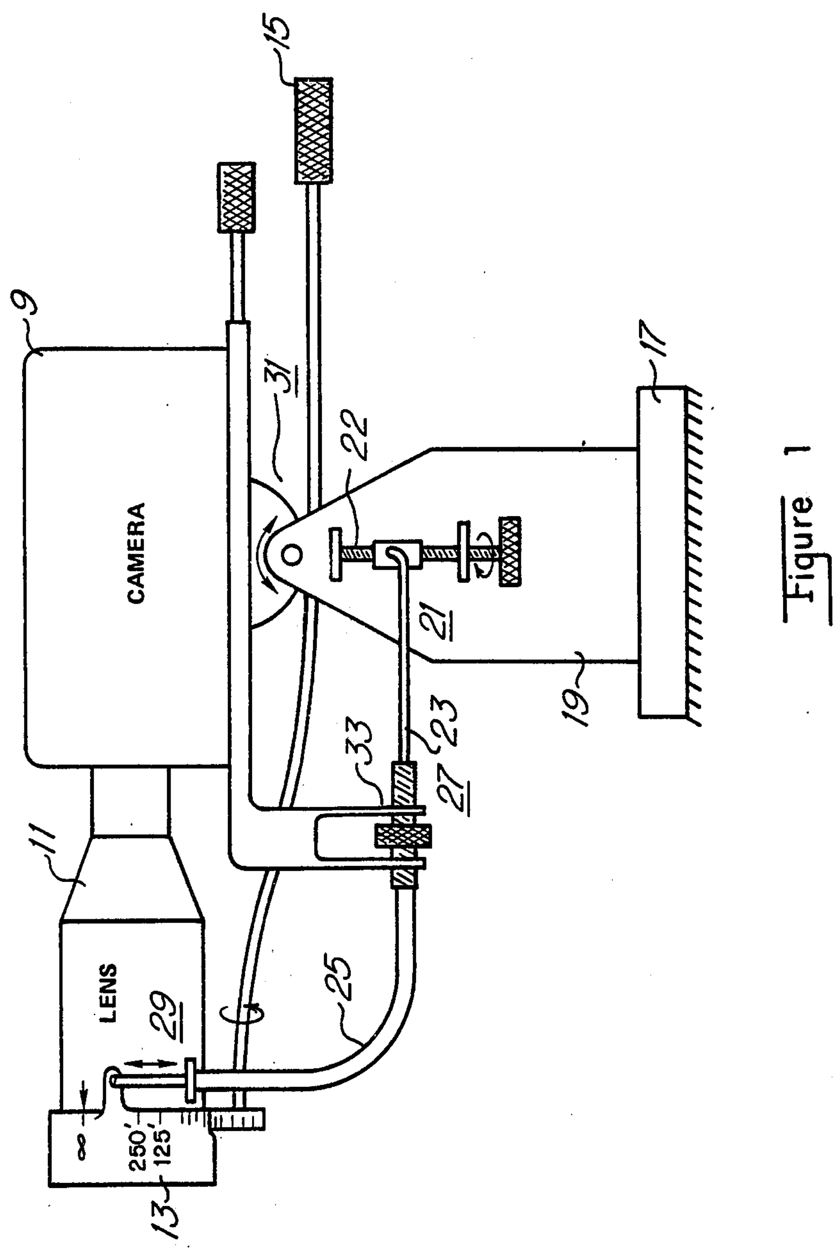
FIG. 1 is a drawing of an autofocusing camera according to one embodiment of the present invention.

Referring now to FIG. 1, there is shown a mechanical embodiment of an autofocusing camera. The basic camera 9 may be a photographic or television camera with a focus-adjustable lens 11 of the type that is rotatable about the optical axis using a focusing ring 13 which may be gear-driven from a focusing handle 15. The support 17 may comprise a tripod (not shown), or the like, and the tilt head base 19 is disposed on top of the support 17. The autofocusing apparatus includes the sine pick-off assembly 21, the push-rod 23 and sheath 25 assembly which transmits the focus-control motion to the lens-focusing ring 13, the infinity adjust knob 27, and the focusing-ring drive assembly 29.

The sine pick-off assembly generates push-rod motion 23, 25 closely proportional to the sine of the angle by which the camera is declined below the horizon. The constant of proportionality mmust be adjusted by rotating the lead screw 22 to set the push-rod 23 at a selectable distance from the pivot 31. This adjustment facilitates changes of lenses, or camera height.

The push-rod motion 23 thus generated by the sine pick-off is coupled to the lens 11 for rotating the focusing ring 13. The effective length of the push-rod can be varied in order to adjust tracking at infinity focus, if ever necessary, by the use of infinity adjustment knob 27. This knob is threaded onto the push-rod sheath 25, which in turn passes freely through a hole in the tilt-head platform 33 for lateral adjustment in and out of the end of sheath 25 relative to the sine pick-off assembly 21.

Spring coupling, or the like, should be used to allow the operator to override the autofocusing feature, as well as to prevent excessive stresses on the linkage if the camera is pointed above the horizon.

To simplify the mechanical linkage in this embodiment, two additional approximations have been made. One is that the distance from the infinity adjustment knob assembly 27 to the sine pick-off 21 is sufficiently greater than the distance from the sine pick-off 21 to the pivot 31 that the resultant motion of the push-rod closely generates the sine of the declination angle. The second approximation is that the rotation of the focusing ring is less than 20° or 30°, so that linear motion of the push-rod is proportionally translated into angular rotation of the ring. These approximations are easily enough met in practice and result in a considerable simplification of the required mechanical linkage.

In operation of the autofocusing camera, the cameraman first levels the tripod. He next points the camera horizontally toward the horizon, and uses the infinity adjust knob 27 to insure that the lens-focusing ring 13 indicates infinity focus. He then tilts the camera downward to pick up an object lying in the plane of the playing field, and focuses on it using the lead-screw knob of the sine pick-off assembly. Focusing will then be automatically achieved for all other points in the field.

Figure 2:
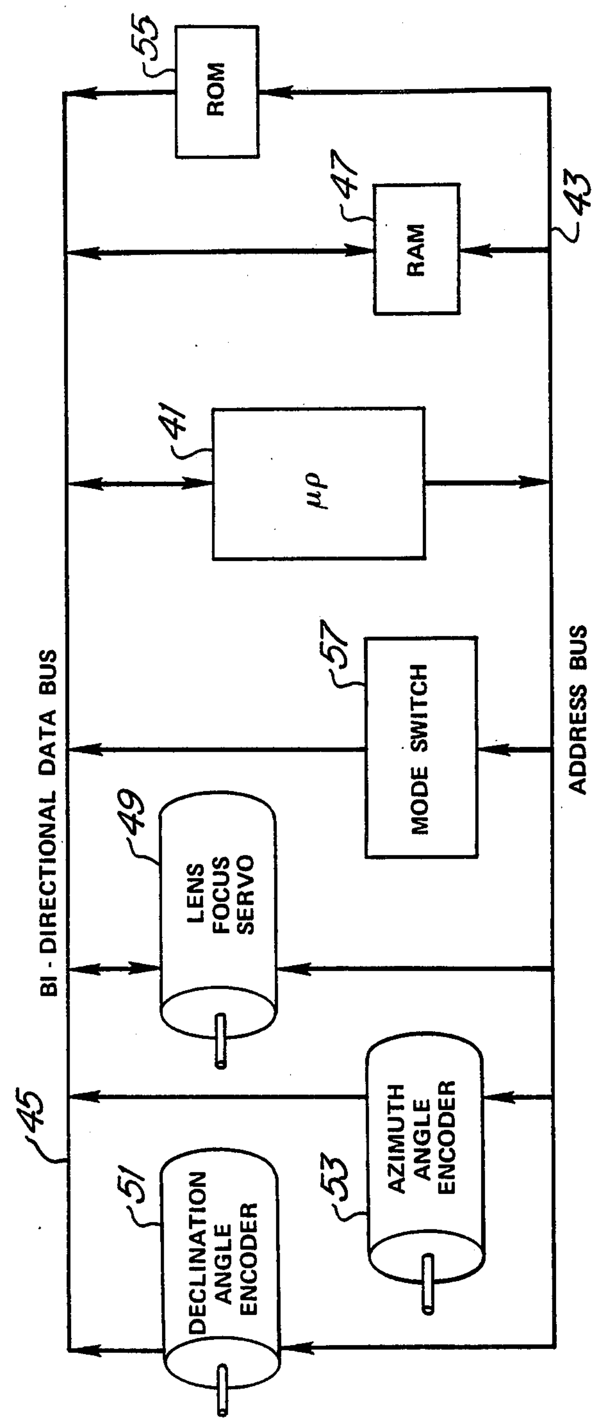
FIG. 2 is a block diagram of the autofocusing camera apparatus according to another embodiment of the present invention.

Referring now to FIG. 2, there is shown a simplified block diagram of microprocessor-based autofocusing apparatus. Using conventional computer bus architecture, the microprocessor 41 can communicate with other elements in the circuit by supplying its appropriate address over the address bus 43. The element so addressed may transmit data or instructions back to the microprocessor 41 via the bidirectional data bus 45. In the case of the random-access memory (RAM) 47 and the lens-focusing servo 49, data may also be sent from the microprocessor 41 to those elements via the same bus 45.

The two shaft-angle encoders 51, 53 are attached to the camera pivots for supplying camera-pointing information to the microprocessor 41. The lens-focusing servo 49 is coupled to the lens-focusing ring of a camera to move the lens in or out to the proper focus position as determined by the microprocessor 41. The lens-position-sensing encoded output of this servo is supplied to the microprocessor 41 via the data bus 45, upon a command from the microprocessor sent via the address bus 43. The program for controlling this operation is stored in read-only memory (ROM) 55. RAM 47 is used to store the learned focus settings corresponding to the associated pointing directions. The microprocessor 41 is used to interpolate between focus settings, as well as for over-all control. The clear/learn/run mode switch 57 is used by the operator to command the mode of operation via the microprocessor 41.

Figure 3:
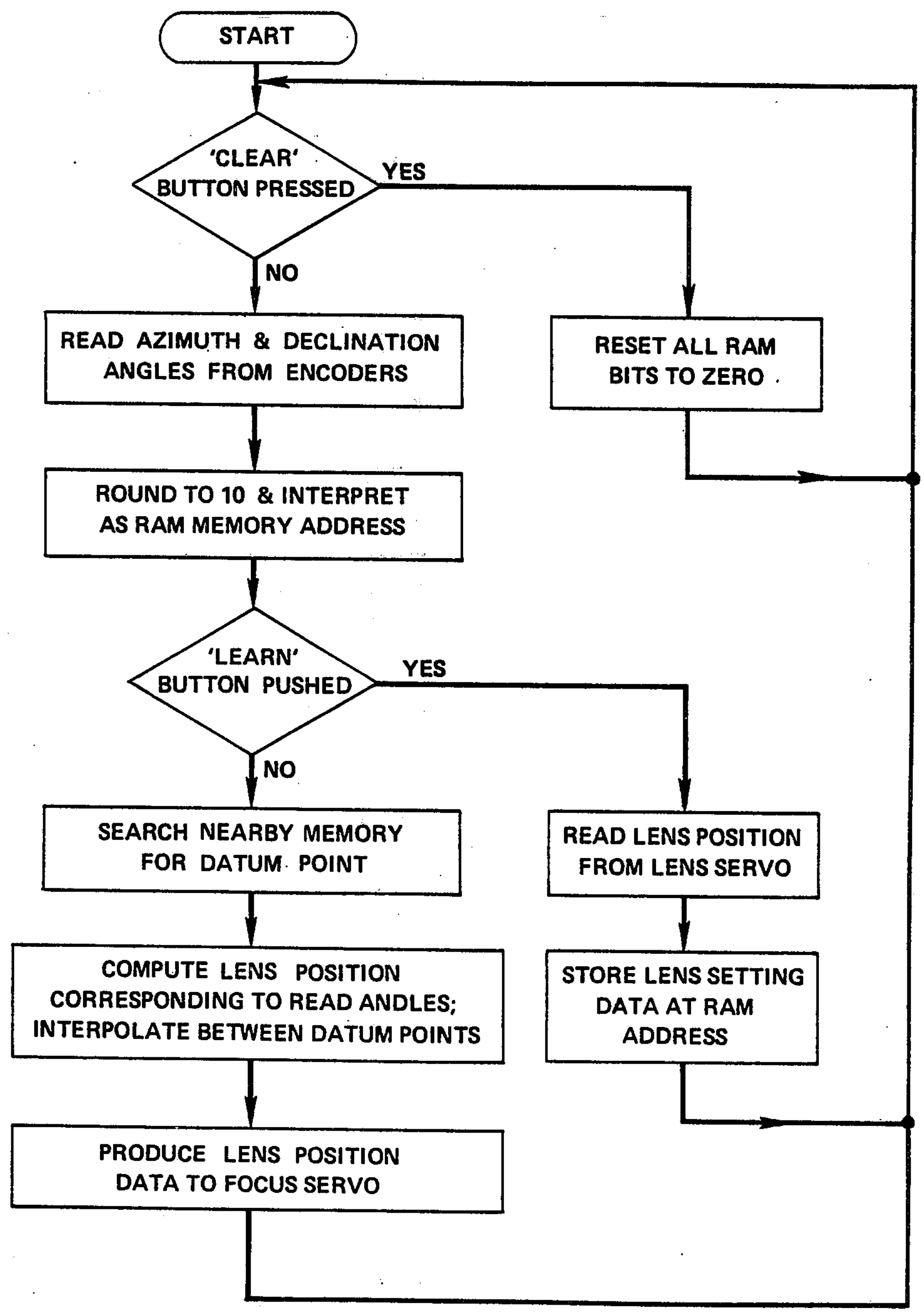
FIG. 3 is a flow chart of the apparatus of FIG. 2.

In operation, and with respect to the flow chart of FIG. 3, a cameraman first clears memory using the CLEAR position of mode switch 57. He then points the camera to the first point of interest, and focuses manually. By then setting the mode switch 57 to LEARN, the microprocessor 41 is commanded to store the first data points, namely, the desired focal setting from the position encoder of the lens servo 49, corresponding to the declination angle and azimuth angle data from encoders 51 and 53. The cameraman then proceeds in a similar manner at a number of points of interest and thereby builds a file of data in RAM 47.

To assure high operating speed while later recalling the data points, the RAM 47 can be organized as an X–Y matrix with each memory location corresponding to a pointing direction. For example, one memory location might correspond to the pointing direction of 20° ± 2½° declination, +5° ± 2½° of azimuth. In that memory location there would then be stored the corresponding focus-setting data. All memory locations need not be filled, since the microprocessor 41 can linearly interpolate between data points and fill in the empty locations.

Figure 4:
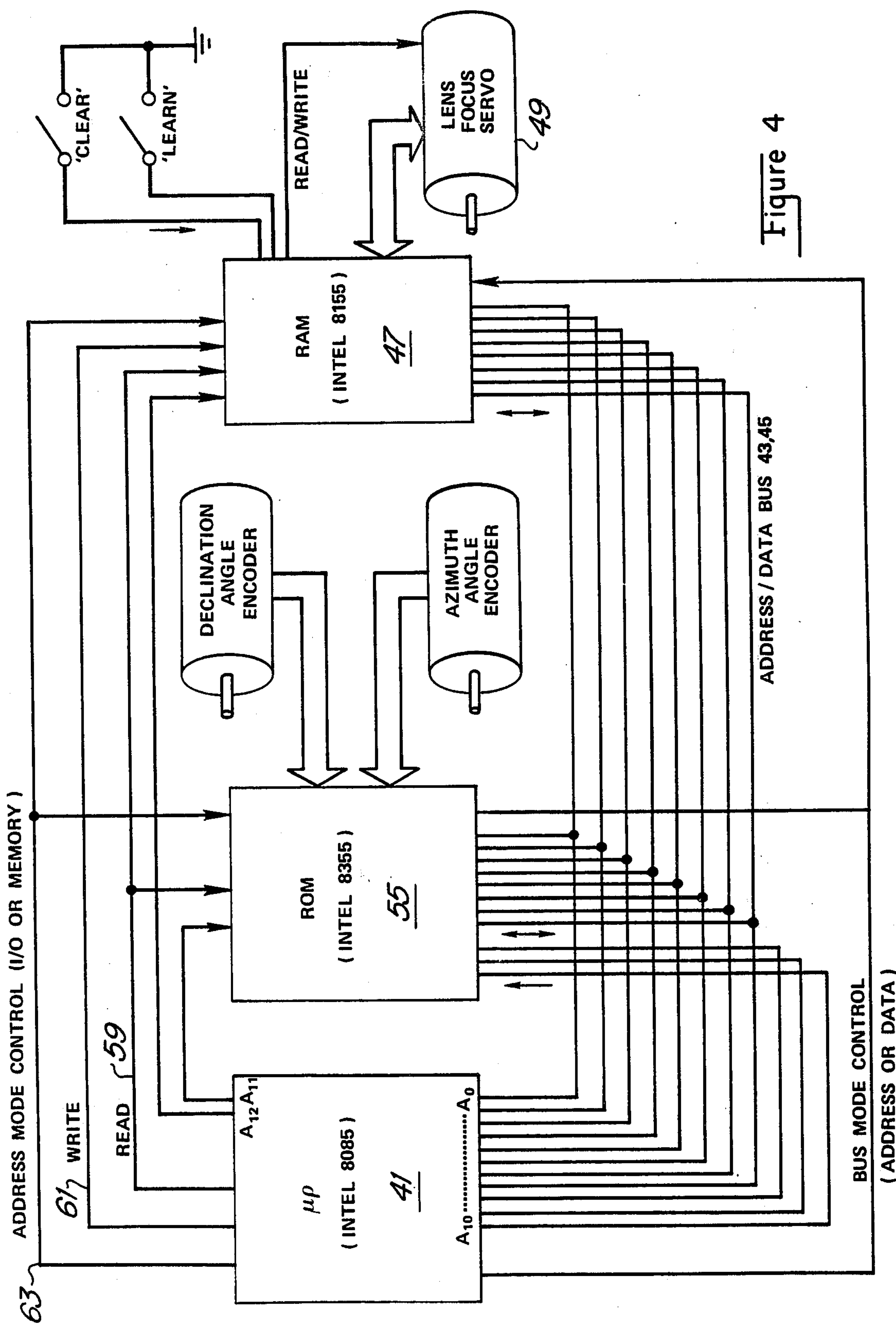
FIG. 4 is a detailed schematic diagram of the apparatus of FIG. 2.

To use the camera, the mode switch 57 is set to RUN. In this mode, the microprocessor 41 continually takes pointing information from encoders 51, 53, and the microprocessor 41 fetches from memory 47 the corresponding focus settings and supplies them via bus 45 to lens servo 49 to produce the desired automatic focus adjustment of the camera. This is facilitated by the focusing servo 49, as shown in the detailed schematic diagram of FIG. 4, which is responsive to binary input signals. It may comprise a conventional digitial-to-analog converter coupled to a conventional analog servo, comprising a motor, a feedback potentiometer, and an operational amplifier.

This lens-focusing servo is controlled by the microprocessor 41 (e.g., INTEL Type 8085) which designates the origin or destination of data via the signals at the A11 and A12 address lines, the read 59 and write 61 lines, and the address mode control line 63. The A11 and A12 address lines specify whether data is passed via the ROM 55 or the RAM 47. The address mode control line 63 specifies whether the data is exchanged with the RAM 47 or the ROM 55, or via their data ports. Finally, the read and write lines 59, 61 allow the microprocessor 41 to specify whether it is receiving or supplying data.

If data is to be read from the ROM 55, the particular word in ROM to be read is specified by the address-/data bus 43, 45. Data words to be read from or written into RAM 47 are similarly specified as to location by the address sent over the same bus.

The RAM 47 may hold 256 eight-bit words. Each eight-bit word, if used, is a lens focus setting. Each of the 256 locations correponds to a pointing direction, in 10-degree increments. The 256 locations are interpreted as a 16-by-16 matrix of azimuth and declination angles. With 16 increments of each angle allowed, and with 10-degree intervals, pointing angles between ± 75 degrees may be accommodated in both azimuth and declination.

Therefore, after the cameraman builds a file of focus data in RAM 47 in the manner previously described, and after the mode switch 57 of FIG. 2 has been operated through CLEAR and LEARN modes, the present apparatus reverts to the RUN mode. In a repetitive manner, it executes the algorithm shown by the flow chart of FIG. 3, continually sampling the pointing direction, rounding off to 10 degrees, looking up the focus setting in the table in memory, and providing the desired setting to the lens-focusing servo 49.

The present invention thus provides self-focusing adjustment for a camera simply in response to either the angle of declination only (on a plane-like field) or in response to both declination angle and azimuth angle (on more complex terrain).

I claim:

1. Camera focusing apparatus for a camera having an adjustable-focus lens operated from a fixed position relative to a horizontal object plane, the apparatus comprising:

support means for the camera rotatable at least about a substantially horizontal axis;

angle-sensing means disposed with respect to said support means to produce an output substantially proportional to the sine of the angular position of the camera about said horizontal axis;

scaling means coupled to the angle-sensing means for altering said output of the angle-sensing means by a constant of proportionality which is indicative of and inversely proportional to the height of the camera above the object plane; and actuating means for converting the altered ouput of said scaling means to focus-adjusting motion of the lens of the camera.

2. Camera focusing system as in claim 1 wherein:

said angle-sensing means responds to the declination angle of the camera about said axis relative to horizontal; and said scaling means includes a movable coupling disposed to be set at a selectable distance from the horziontal axis.

3. Camera-focusing apparatus for a camera having a focus-adjustable lens operated at a fixed location relative to the object, the apparatus comprising:

support means for the camera disposed to allow rotation thereof about substantially horizontal and vertical axes;

angle-sensing means disposed to produce outputs representative of the pointing directions of th camera relative to said support means;

lens position-sensing means for producing an output indicative of the lens focus setting of the camera;

storage means coupled to said angle-sensing means and said lens position-sensing means for selectively storing the output indicative of the sensed lens position and corresponding outputs representative of the sensed camera-pointing directions;

means for selectively recalling from said storage means the stored output indicative of lens focus setting corresponding substantially to the outputs produced by the angle-sensing means in response to the camera attaining a selected pointing direction; and lens-positioning mens responsive to said recalled output for altering the lends focus adjustment in response thereto.

4. The method of adjusting the focus of a camera operated from a fixed position relative to a horizontal object plane, the method comprising:

supporting the camera for rotation at least about a substantially horizontal axis;

producing an output substantially proportional to the sine of the angular position of the camera about the axis;

scaling the sine output relative to the height of the camera relative to the object plane; and applying the scaled output to the camera as focus-adjusting motion of the lens thereof.

5. The method of adjusting the focus of a camera operated at a fixed position relative to an object, the method comprising:

supporting the camera for rotation about substantially horizontal and vertical axes;

producing outputs representative of the angular positions of the camera about the axes;

producing an output representative of the focus setting of the camera pointing at an object located in the directions identified by the angular positions aout the axes;

storing the output representative of the focus setting at the corresponding angular positions of the camera about the axes;

selectively recalling the stored outputs representative of focus settings of the camera in response to the camera being oriented at the angular positions corresponding thereto; and altering the focus setting of the camera in response to the recalled focus-setting outputs.

* * * * *